June 19, 1956  G. E. MILLIGAN  2,750,917
ROTATABLE DISC INDICATOR ATTACHMENT
Filed May 7, 1953

INVENTOR
GEORGE E. MILLIGAN

BY *Fisher & Christen,*

ATTORNEYS

United States Patent Office 2,750,917
Patented June 19, 1956

2,750,917

ROTATABLE DISC INDICATOR ATTACHMENT

George E. Milligan, Medford, Oreg.

Application May 7, 1953, Serial No. 353,534

4 Claims. (Cl. 116—130)

This invention relates to indicators and more especially to a rotatable disc indicator attachment for use with radio aids to the navigation of aircraft.

It is desirable to employ an indicator, commonly known as an automatic direction finder, as an aid to flight along a radial line to a radio station, to show any deviation of the craft from the desired course. An automatic direction finder is a radio instrument which, having been tuned to a station, points continuously and automatically to that station. Such indicators are commonly constructed so that when flying on a course directly toward or inbound on a station the indicator points to a "zero" or "on course" position, and when flying on a course directly away from a station the indicator points 180° away from the first mentioned position to another "zero" or "on course" position. Any deviation from the course is registered by a movement of the indicator either to the right or to the left. Hence, these indicators are sometimes referred to as being of the "left-right" type. An important characteristic of this type indicator is that, whether inbound or outbound on a station, the "right" or "left" position of the needle from the desired bearing always indicates the direction to turn the craft to get back on course.

From the above, it is observed that the usefulness of aircraft radio instruments of the "left-right" type is limited almost entirely to flight along radial lines to a radio station.

Accordingly, it is a primary object of this invention to enlarge the usefulness of instruments of the "left-right" type, to include flight along courses other than radial to a radio station by providing reference indicia for use therewith.

It is a further object of this invention to provide a rotatable disc, calibrated in degrees, which is adapted to be mounted in superposed relation to an automatic direction finder dial for indicating bearing and azimuth with respect to a radio station.

It is another object of this invention to provide a rotatable disc, bearing reference indicia, which may be cheaply constructed and easily installed in superposed relation to an indicator.

I accomplish these and other objects of my invention by providing an indicator dial attachment comprising a disc, reference calibrations inscribed on said disc and means for rotatably mounting said disc in superposed relation to the dial, thereby permitting the position of the calibrations to be adjusted with respect to the dial.

I further accomplish the objects of my invention by providing a transparent disc, indicia inscribed on the disc graduating the same into geometrical degrees, means rotatably mounting said disc in superposed relation to the automatic direction finder dial, said means comprising a plurality of lugs frictionally engaging the periphery of the disc, a spacer carried by the disc for engaging the automatic direction finder and a knob carried by the disc at the center thereof for manually rotatably adjusting the disc according to compass heading whereby bearing and azimuth readings with respect to a radio station may be had.

Some of the objects of this invention having been stated, others will appear as the description proceeds when taken in connection with the accompanying drawing in which.

Figure 1:
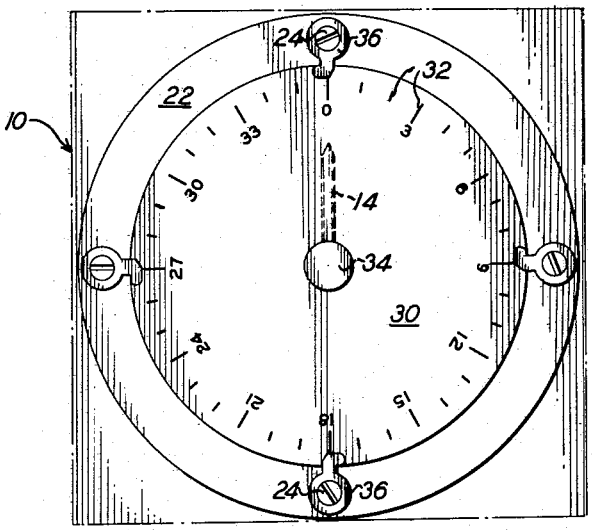
Fig. 1 is a front elevation of a portion of an aircraft instrument panel showing my rotatable disc indicator attachment attached for use with an automatic direction finder.
Figure 2:
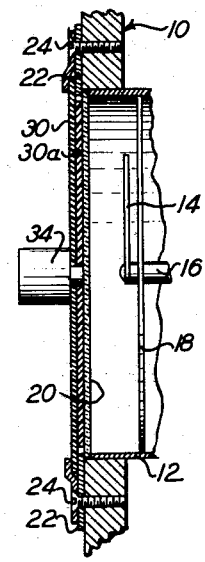
Fig. 2 is a side elevation with parts in section showing a preferred manner of attaching my rotatable disc indicator attachment.

Referring more specifically to the drawings, Figs. 1 and 2 show an aircraft instrument panel broadly referred to at 10. Fig. 2 shows an automatic direction finder designated at 12 mounted in the instrument panel 10. The automatic direction finder includes a needle 14 shown mounted on a shaft 16 projecting through a face plate 18. The usual glass dial cover 20 for keeping out dust and for protecting the needle 14, is shown positioned in spaced relation to the face plate 18 by the retaining ring 22. The ring 22 is in turn fastened to the instrument panel 10 by screws 24.

Referring especially to Fig. 1, a disc 30 having graduations or indicia 32 in the form of geometric degrees is shown operably positioned in superposed relation to the automatic direction finder 12. It is desirable that the disc 30 be made from some sort of transparent material such as glass or plastic since it is essential that the relationship of the needle and the indicia be available at a glance. The indicia 32 may be inscribed in any suitable way, such as by painting them on the underneath side of the disc 30, so that they will be visible from the front. The indicia 32 may equally as well be positioned inside or on the front of the disc 30. It is to be understood that some other means, such as an arcuate viewing slot (not shown) in the disc, could be provided for visually determining this relationship, rather than making the disc entirely or in part from transparent material. In this case the disc is shown as being provided with a spacer 30a to rest against the glass cover 20 for maintaining the disc in proper spaced relation thereto. It is to be understood that this spacer 30a may be fashioned in any desirable shape and from any desirable material to conform to the disc 30. The spacer 30a may be integral with the disc 30, suitably fastened thereto, or it may be in the form of a separate element confined between the disc 30 and the glass 20. A knob 34 is carried by the disc 30 to facilitate manual rotation thereof.

The disc 30 may be installed for rotation with respect to the automatic direction finder by first removing the screws 24. The disc 30 is then placed against the ring 22. Lugs 36 are positioned to retain the disc 30 and are fastened, together with the ring 22, to the instrument panel 10 by replacing the screws 22. Thus, the disc 30 is confined between and frictionally engaged by the ring 22 and a plurality of lugs 36. It is preferable that the lugs 36 be constructed from metal which may be bent to adjust the pressure on the disc 30 so as to insure sufficient friction to hold the disc 30 in place once it has been set and yet permit manual rotation thereof. It obvious that, if desired, the glass 20 could be replaced entirely by the disc 30 while mounting the disc 30 in a similar manner.

Figure 3:
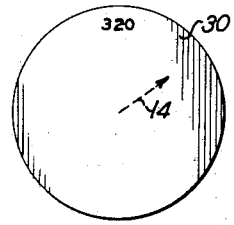
Figs. 3, 4, 5, 6, 7 and 8 are schematic illustrations of the use of my invention showing my rotatable disc indicator attachment and the needle of an automatic direction finder in different positions as it appears in actual operation.
Figure 4:
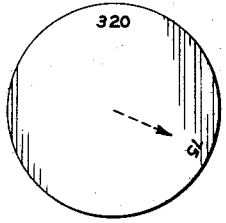
Figure 5:
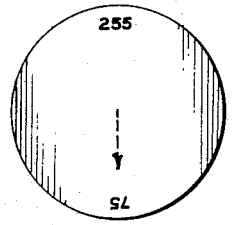
Figure 6:
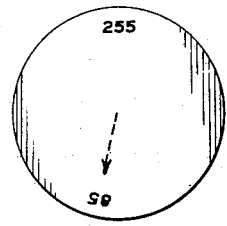
Figure 7:
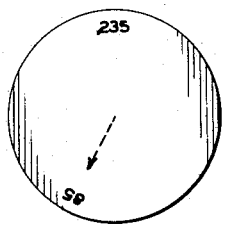
Figure 8:
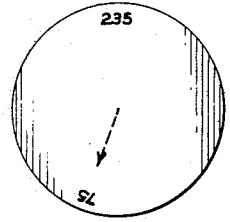

Now, referring to Figs. 3, 4, 5, 6, 7 and 8, some of the uses of the invention will become apparent. Suppose that it is desired to intercept and track out on a magnetic course of 255° from a radio station, and that the present magnetic heading is 320° (ascertained from a compass, not shown), with the station ahead and to the right (Fig. 3). With the dial adjusted to show 320° at the top, proceed on the present course until the automatic direction finder needle is adjacent the figure representing 75° on the disc (Fig. 4) which is the reciprocal of the desired outbound track.

Theoretically this track has now been reached. A heading of 255° is now taken. After rotating the disc to simulate this new heading outbound the needle will be adjacent the figure of 75° on the dial.

It may develop that after proceeding on this course for some time, due to wind, for example, the needle points to the figure representing 85° on the dial. Whether inbound or outbound on a station, the "right" or "left" position of the needle from the desired bearing always indicates the direction to turn to get back on course. In this case, the desired bearing is 10° to the left of the present actual bearing. By doubling that figure and turning left 20° to a heading of 235°, the needle is still adjacent 85° (Fig. 7), a convenient adjustment may be made to return to the desired track. By maintaining this heading, the automatic direction finder needle will slowly be returned to the desired bearing inbound of 75° (Fig. 6), thus indicating a return to the desired track.

In order to stay on this desired course without again being blown off by wind, assuming that the same 10° drift still prevails, a heading of 255° minus this 10° or 245° is taken.

While the invention has been described in connection with an automatic direction finder it is obvious that the same may be employed, with minor modifications, with any type indicator.

It is then seen, therefore, that I have provided a simple attachment for providing reference indicia for indicators and which is particularly suited to easy attachment for use with radio aids to the navigation of aircraft, to provide ready bearing and azimuth references with respect to a radio station.

While the preferred construction has been described in detail, it is to be understood further modification may be made without departing from the invention the scope of which is defined by the appended claims.

I claim:

1. The combination of an indicator attachment and an automatic direction finder dial, comprising a transparent disc, indicia inscribed on the disc graduating the same into geometrical degrees, means rotatably mounting said disc adjacent the dial and a knob carried by the disc, whereby the position of the disc may be rotatably adjusted relative to the dial.

2. The combination of an indicator attachment and an automatic direction finder comprising, a disc, indicia inscribed on the disc graduating the same into geometrical degrees, means rotatably mounting said disc in superposed relation to the automatic direction finder dial, said means comprising a plurality of lugs frictionally engaging the periphery of the disc, and a knob carried by the disc for manually rotatably adjusting the disc according to compass heading whereby bearing and azimuth readings with respect to a radio station may be had.

3. An indicator attachment for use with automatic direction finders and the like comprising a transparent disc, indicia inscribed on the disc graduating the same into geometrical degrees, means for rotatably mounting said disc in superposed relation to the automatic direction finder dial, a spacer carried by the disc for engaging the automatic direction finder dial and a knob carried by the disc at the center thereof for manually rotatably adjusting the disc according to compass heading whereby bearing and azimuth readings with respect to a radio station may be had.

4. An indicator attachment for use with automatic direction finders and the like comprising, a transparent disc, indicia inscribed on the disc graduating the same into geometrical degrees, means for rotatably mounting said disc in superposed relation to the automatic direction finder dial, said means comprising a plurality of lugs frictionally engaging the periphery of the disc, a spacer carried by the disc for engaging the automatic direction finder dial and a knob carried by the disc at the center thereof for manually rotatably adjusting the disc according to compass heading whereby bearing and azimuth readings with respect to a radio station may be had.

References Cited in the file of this patent

UNITED STATES PATENTS

| | | |
|---|---|---|
| 1,731,749 | Miller | Oct. 15, 1929 |
| 2,083,825 | Bousfield | June 15, 1937 |
| 2,189,790 | Gardner | Feb. 13, 1940 |
| 2,282,209 | Pepper | May 5, 1942 |
| 2,612,132 | Triplett | Sept. 30, 1952 |